(12) United States Patent
Spek

(10) Patent No.: US 8,155,805 B2
(45) Date of Patent: Apr. 10, 2012

(54) FLIGHT GUIDANCE AND NAVIGATION DISPLAY FOR A HELICOPTER

(75) Inventor: Jorrit van der Spek, Kiefersfelden (DE)

(73) Assignee: Eurocopter Deutschland GmbH, Donauworth (DE)

( * ) Notice: Subject to any disclaimer, the term of this patent is extended or adjusted under 35 U.S.C. 154(b) by 525 days.

(21) Appl. No.: 12/436,334

(22) Filed: May 6, 2009

(65) Prior Publication Data

US 2009/0281684 A1     Nov. 12, 2009

(30) Foreign Application Priority Data

May 9, 2008   (DE) .......................... 10 2008 023 040

(51) Int. Cl.
    *G06F 7/70*     (2006.01)
(52) U.S. Cl. .............................. 701/14; 701/3
(58) Field of Classification Search ................ 701/3, 14, 701/206
    See application file for complete search history.

(56) References Cited

U.S. PATENT DOCUMENTS

| | | | |
|---|---|---|---|
| 5,920,321 A * | 7/1999 | Owen et al. ................... | 345/427 |
| 6,421,603 B1 * | 7/2002 | Pratt et al. ..................... | 701/206 |
| 6,972,696 B2 | 12/2005 | Rogers et al. | |
| 7,010,398 B2 * | 3/2006 | Wilkins et al. ..................... | 701/3 |
| 7,289,906 B2 * | 10/2007 | van der Merwe et al. .... | 701/214 |
| 7,365,652 B2 * | 4/2008 | Scherbarth ..................... | 340/974 |
| 7,603,209 B2 * | 10/2009 | Dwyer et al. ................... | 701/14 |
| 2006/0235581 A1 * | 10/2006 | Petillon ............................. | 701/3 |
| 2007/0276706 A1 * | 11/2007 | Dunsky ............................. | 705/5 |
| 2009/0248224 A1 * | 10/2009 | Tschannen ....................... | 701/3 |

FOREIGN PATENT DOCUMENTS

EP       1 462 767 A1     9/2004

OTHER PUBLICATIONS

Andrew K. Barrows et al., "Tunnel-in-the-Sky Cockpit Display for Complex Remote Sensing flight Trajectories", Jun. 21-24, 1999, presented at the Fourth International Airborne Remote Sensing Conference and Exhibition/21st Canadian Symposium on Remote Sensing, Ottawa, Ontario, Canada.
Kohei Funabiki et al., "Attention Allocation in Tunnel-in-the-Sky on HUD and HDD for Visual Flight", Oct. 21, 2007, Japan Aerospace Exploration Agency, 26th Digital Avionics Systems Conference, Tokyo, Japan.
E. Theunissen et al., "Terrain Following and Terrain Avoidance with Synthetic Vision", Oct. 30, 2005, 24th Digital Avionics Systems Conference.

* cited by examiner

*Primary Examiner* — Hussein A. Elchanti
(74) *Attorney, Agent, or Firm* — Brooks Kushman P.C.

(57) ABSTRACT

A flight guidance and navigation display (10) for a helicopter, includes a three-dimensional, semicircular flight guidance and navigation tunnel (12) to display a planned flight path of the helicopter; a circular surface (14), which is integrated in the flight guidance and navigation tunnel (12), which circular surface (14) includes a diameter that corresponds to that of the flight guidance and navigation tunnel (12), for displaying a longitudinal position within the flight guidance and navigation tunnel (12); a flight path prediction icon (16) for displaying a position of the helicopter relative to the flight guidance and navigation tunnel (12); and a command signal (18) that relates to the air speed, wherein via the command signal (18) a deviation from a reference speed that has been predetermined by flight planning is displayed.

7 Claims, 3 Drawing Sheets

FLIGHT GUIDANCE AND NAVIGATION DISPLAY FOR A HELICOPTER

The invention relates to a flight guidance and navigation display for a helicopter, according to the type stated in claim 1.

BACKGROUND OF THE INVENTION

For fixed-wing aircraft, flight guidance and navigation displays with a tunnel-like display of a planned flight path in space, so-called tunnel-in-the-sky displays, are known. However, even for fixed-wing aircraft, flight guidance and navigation systems comprising tunnel-in-the-sky displays have not yet been approved for instrument flight.

Due to their tunnel-like display of the planned flight path, the known flight guidance and navigation displays, hereinafter also referred to as three-dimensional flight guidance and navigation displays, provide information on lateral (heading) and vertical (flight altitude) guidance that comprises intuitive visualisation for the pilot. The known three-dimensional flight guidance and navigation displays are associated with a disadvantage in that they do not furnish any information about longitudinal flight guidance and navigation (flight speed/position-time). There is a further disadvantage in that the known three-dimensional flight guidance and navigation displays were essentially developed for fixed-wing aircraft, and do thus not take into account the aerophysical characteristics of a helicopter.

OBJECTS AND SUMMARY OF THE INVENTION

It is thus the object of the invention, while avoiding the above-mentioned disadvantages, to provide a flight guidance and navigation display for a helicopter, in which flight guidance and navigation display the longitudinal flight guidance and navigation, hereinafter also referred to as the fourth dimension, comprises intuitive visualisation, with the presentation of said flight guidance and navigation display taking into account the aerophysical characteristics of a helicopter.

This object is met by the characteristics of claim 1.

The subordinate claims form advantageous improvements of the invention.

According to the invention, the flight guidance and navigation display for a helicopter comprises a three-dimensional, semicircular flight guidance and navigation tunnel to display a planned flight path of the helicopter in lateral and vertical direction; a circular surface, which is integrated in the flight guidance and navigation tunnel, which circular surface comprises a diameter that corresponds to that of the flight guidance and navigation tunnel, for displaying a longitudinal position within the flight guidance and navigation tunnel; a flight path prediction icon for displaying a position of the helicopter relative to the flight guidance and navigation tunnel; as well as a command signal that relates to the air speed, wherein by means of the command signal a deviation from a reference speed that has been predetermined by flight planning is displayed.

The speed dependent circular surface, which "glides" along the flight guidance and navigation tunnel, advantageously provides a four-dimensional flight guidance and navigation display for the first time. The circular surface is used as a reference surface, i.e. in order to fly along the flight path that has been predetermined by the flight guidance and navigation tunnel, a pilot merely needs to keep the flight path prediction icon within the reference surface. Any corrections that may be necessary to maintain the longitudinal flight specifications are displayed by means of the command signal.

In an advantageous manner a flight guidance and navigation display is thus provided which in an advantageous manner provides a pilot not only with information that comprises intuitive visualisation relating to lateral and vertical flight guidance and navigation, but also with intuitively perceptible information about the longitudinal flight guidance and navigation. By way of the command signal, the information necessary for correction is centrally displayed in the pilot's field of vision so that any deviation from the longitudinal flight guidance and navigation can be compensated for right at the beginning by means of an increase or a decrease in speed.

There is a further advantage in that the flight guidance and navigation tunnel, which according to the invention is semi-circular in shape, when compared to the rectangular design known for fixed-wing aircraft comprises less position reference information. Said flight guidance and navigation tunnel according to the invention thus takes into account aerophysical characteristics of the helicopter that are substantially different from those of fixed-wing aircraft. Flight guidance and navigation is thus less restrictive, which to the helicopter pilot signifies a noticeable reduction in the workload.

According to a particularly advantageous embodiment, a circular reference speed icon with a diameter that corresponds to that of the flight guidance and navigation tunnel is integrated in the flight guidance and navigation tunnel. Corresponding to the reference surface, the reference speed icon also "glides" along the flight guidance and navigation tunnel, wherein the reference speed icon, in contrast to the reference surface, moves at reference speed along the flight guidance and navigation tunnel. Depending on the longitudinal position of the reference speed icon relative to the circular reference surface, the icons, whose diameters are identical, appear to be of different sizes due to the perspective projection. In other words, the deviation between the reference speed icon and the reference surface is a measure of the actual deviation from the predetermined reference speed. This presentation provides an advantage in that the pilot can intuitively estimate the deviation and thus the extent of compensation, and can make corresponding adjustments.

Preferably, the command signal is in the shape of an arrow, comprising a point. If an increase in the speed is required, the point of the command signal is aligned in the direction of the planned flight path; while if a decrease in the speed is required, the point of the command signal is aligned against the direction of the planned flight path. This presentation has been shown to be particularly advantageous because in this way the pilot is provided with an intuitive presentation of the command to be carried out, which presentation is simple to interpret.

Since the requirements of flight guidance and navigation differ, e.g. very narrow requirements for a landing approach versus less restrictive requirements for a cross-country flight, the diameter of the flight guidance and navigation tunnel is adjustable, i.e. adaptable to flight guidance and navigation. For example, in the case of a landing approach a small tunnel diameter is set, while in the case of the above-mentioned cross-country flight a larger diameter is set.

Further advantages, characteristics and application options of the present invention are set out in the following description in conjunction with the exemplary embodiments shown in the drawing.

Below, the invention is described in more detail with reference to the exemplary embodiments shown in the drawing.

BRIEF DESCRIPTION OF THE DRAWINGS

The terms and the associated reference characters set out in the list of reference characters later in this document are used in the description, in the patent claims, in the abstract and in the drawing. The following are shown:

In order to prevent repetition, in the following description and in the figures identical components have the same reference characters provided no further differentiation is required or sensible.

MORE DETAILED DESCRIPTION

Figure 1:
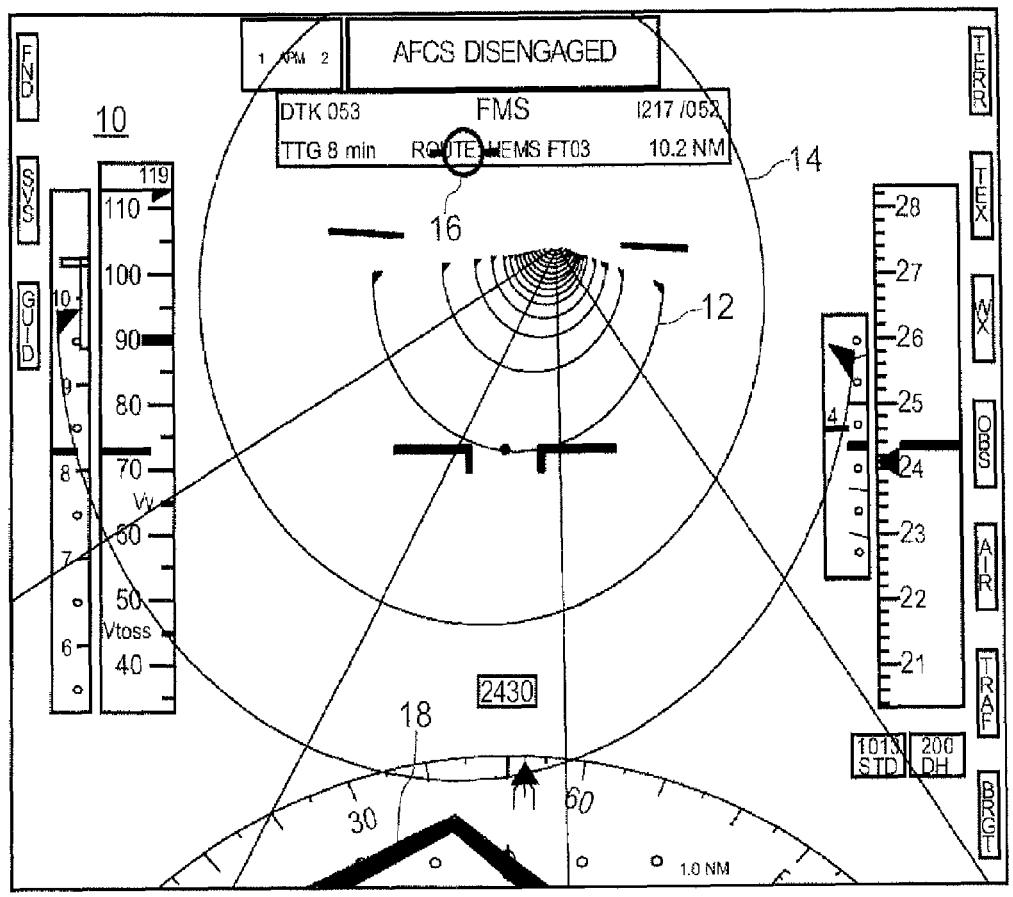
FIG. 1 a view of a first embodiment of the flight guidance and navigation display, according to the invention, for a helicopter.
Figure 2:
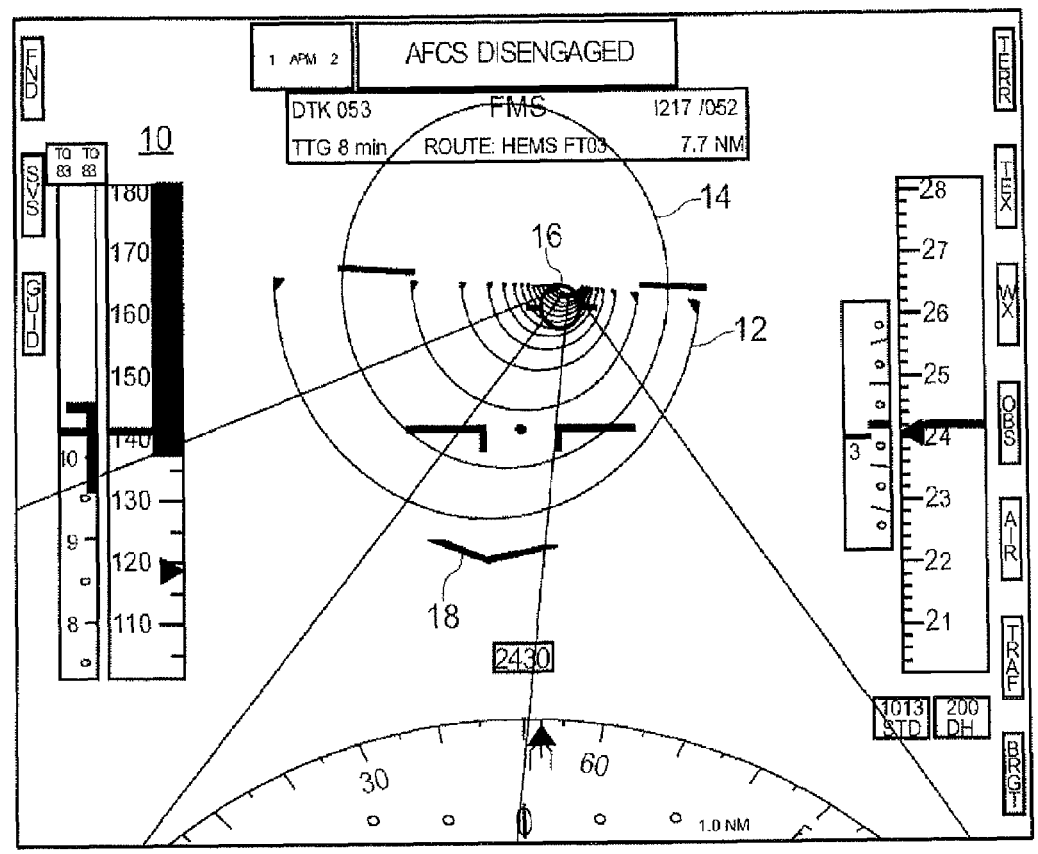
FIG. 2 a further view of the flight guidance and navigation display, according to the invention, from FIG. 1.

FIGS. 1 and 2 show a first exemplary embodiment of a flight guidance and navigation display, overall designated 10, for a helicopter.

As a central display element the flight guidance and navigation display 10 comprises a semicircular three-dimensional flight guidance and navigation tunnel 12 to show a planned flight path of the helicopter in lateral and vertical direction, as well as a circular surface 14, hereinafter also referred to as the reference surface, which circular surface 14 is integrated in the flight guidance and navigation tunnel 12 and comprises a diameter that corresponds to that of the flight guidance and navigation tunnel 12, for displaying a longitudinal position within the flight guidance and navigation tunnel 12. The reference surface 14 "glides" through the flight guidance and navigation tunnel 12 at the speed of flight of the helicopter.

Furthermore, the flight guidance and navigation display 10 comprises a flight path prediction icon 16 that shows the actual position of the helicopter relative to the flight guidance and navigation tunnel. The flight path prediction icon also depends on the flight speed. In order to fly along the planned flight path that is predetermined by the flight guidance and navigation tunnel 12, a pilot must keep the flight path prediction icon 16 within the reference surface 14.

Any deviation from the longitudinal flight path, i.e. any deviation between the actual speed and the predetermined desired speed, is displayed by means of a command signal 18. In this arrangement the command signal 18 is in the shape of an arrow, comprising a point.

Depending on the present deviation, the tip of the command signal 18 is aligned either in the direction of flight (compare FIG. 1) or against the direction of flight (compare FIG. 2). This provides the pilot in a simple manner with an intuitive presentation of a measure to be taken, namely a speed increase or a speed decrease.

Figure 3:
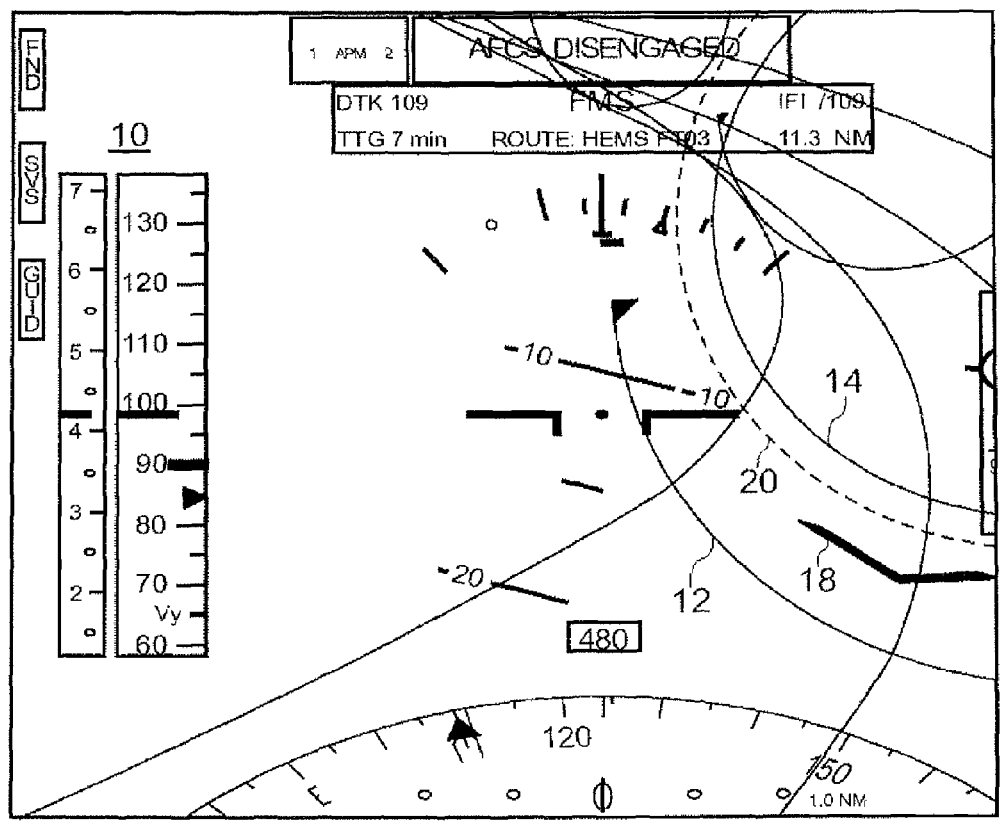
FIG. 3 a view of a second embodiment of the flight guidance and navigation display, according to the invention, for a helicopter.

The exemplary embodiment of FIG. 3 differs from that shown in FIGS. 1 and 2 in that integrated in the flight guidance and navigation tunnel 12 is a circular reference speed icon with a diameter that corresponds to that of the flight guidance and navigation tunnel 12. The reference speed icon moves at reference speed along the flight guidance and navigation tunnel 12. The deviation between the reference speed icon 20 and the reference surface 14, which deviation results from the perspective projection, is a measure of the actual deviation from the predetermined reference speed.

This display is associated with an advantage in that the pilot can intuitively estimate the deviation and thus the extent of compensation, and can make corresponding adjustments.

LIST OF REFERENCE CHARACTERS

10 Flight guidance and navigation display
12 Flight guidance and navigation tunnel
14 Circular surface/reference surface
16 Flight path prediction icon
18 Command signal
20 Reference speed icon

The invention claimed is:

1. A flight guidance and navigation display for a helicopter, comprising
    a three-dimensional, semicircular flight guidance and navigation tunnel to display a planned flight path of the helicopter;
    a circular surface, which is integrated in the flight guidance and navigation tunnel, which circular surface comprises a diameter that corresponds to that of the flight guidance and navigation tunnel, for displaying a longitudinal position within the flight guidance and navigation tunnel;
    a flight path prediction icon for displaying a position, projected into the future, of the helicopter relative to the flight guidance and navigation tunnel; and
    a command signal that relates to the air speed, wherein by means of the command signal a deviation from a reference speed that has been predetermined by flight planning is displayed, the command signal being in the shape of an arrow, comprising a point, wherein if an increase in the speed is required, the point of the command signal is aligned in the direction of the planned flight path, while if a decrease in the speed is required, the point of the command signal is aligned against the direction of the planned flight path.

2. The flight guidance and navigation display according to claim 1, wherein a circular reference speed icon with a diameter that corresponds to that of the flight guidance and navigation tunnel is integrated in the flight guidance and navigation tunnel.

3. The flight guidance and navigation display according to claim 1, wherein the diameter of the semicircular flight guidance and navigation tunnel is adjustable.

4. The flight guidance and navigation display according to claim 2, wherein if an increase in the speed is required, the arrow of the command signal is aligned in the direction of the planned flight path, while if a decrease in the speed is required, the arrow of the command signal is aligned against the direction of the planned flight path.

5. The flight guidance and navigation display according to claim 2, wherein the diameter of the semicircular flight guidance and navigation tunnel is adjustable.

6. The flight guidance and navigation display according to claim 4, wherein the diameter of the semicircular flight guidance and navigation tunnel is adjustable.

7. A flight guidance and navigation display for a helicopter, comprising
    a three-dimensional, semicircular flight guidance and navigation tunnel to display a planned flight path of the helicopter, the tunnel including a circular reference speed icon with a diameter that corresponds to that of the flight guidance and navigation tunnel
    a circular surface, which is integrated in the flight guidance and navigation tunnel, which circular surface comprises a diameter that corresponds to that of the flight guidance and navigation tunnel, for displaying a longitudinal position within the flight guidance and navigation tunnel;
    a flight path prediction icon for displaying a position, projected into the future, of the helicopter relative to the flight guidance and navigation tunnel; and
    a command signal that relates to the air speed, wherein by means of the command signal a deviation from a reference speed that has been predetermined by flight planning is displayed, the command signal being in the shape of an arrow, comprising a point, wherein if an increase in the speed is required, the point of the command signal is aligned in the direction of the planned flight path, while if a decrease in the speed is required, the point of the command signal is aligned against the direction of the planned flight path.

* * * * *